US012602282B2

(12) United States Patent
Siadri

(10) Patent No.: US 12,602,282 B2
(45) Date of Patent: Apr. 14, 2026

(54) MEMORY DEFECT MANAGEMENT

(71) Applicant: Microsoft Technology Licensing, LLC, Redmond, WA (US)

(72) Inventor: Ravi Kumar Siadri, Visakhapatnam (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 25 days.

(21) Appl. No.: 18/668,854

(22) Filed: May 20, 2024

(65) Prior Publication Data

US 2025/0355763 A1 Nov. 20, 2025

(51) Int. Cl.
*G06F 11/10* (2006.01)

(52) U.S. Cl.
CPC ...... *G06F 11/1016* (2013.01); *G06F 11/1004* (2013.01)

(58) Field of Classification Search
CPC ......................... G06F 11/1016; G06F 11/1004
See application file for complete search history.

(56) References Cited

U.S. PATENT DOCUMENTS

| | | | | |
|---|---|---|---|---|
| 2003/0061532 A1* | 3/2003 | Benedix | ................. | G11C 29/78 |
| | | | | 714/6.32 |
| 2013/0060996 A1* | 3/2013 | Berke | ................... | G06F 3/0683 |
| | | | | 711/E12.078 |
| 2014/0281151 A1* | 9/2014 | Yu | .......................... | G11C 29/52 |
| | | | | 711/103 |

* cited by examiner

*Primary Examiner* — Thien Nguyen

(57) ABSTRACT

Systems and methods are provided for implementing improved memory defect management. Bad pages, referring to portions of memory affected by memory errors, are identified by an operating system ("OS") of a computing system. A list of bad pages may be periodically uploaded to a cloud data storage. The OS may also send the list of bad pages to a basic input/output system ("BIOS") for repair of some of the bad pages. A list of repaired bad pages or corresponding status information may be sent to the OS. In some examples, the list of bad pages is compared with the list of repaired bad pages and may be updated accordingly. The list of bad pages may be compared with a previously uploaded list of bad pages that has been received from the cloud data storage. One list may be updated with, or replaced by, the other list based on the comparison.

20 Claims, 8 Drawing Sheets

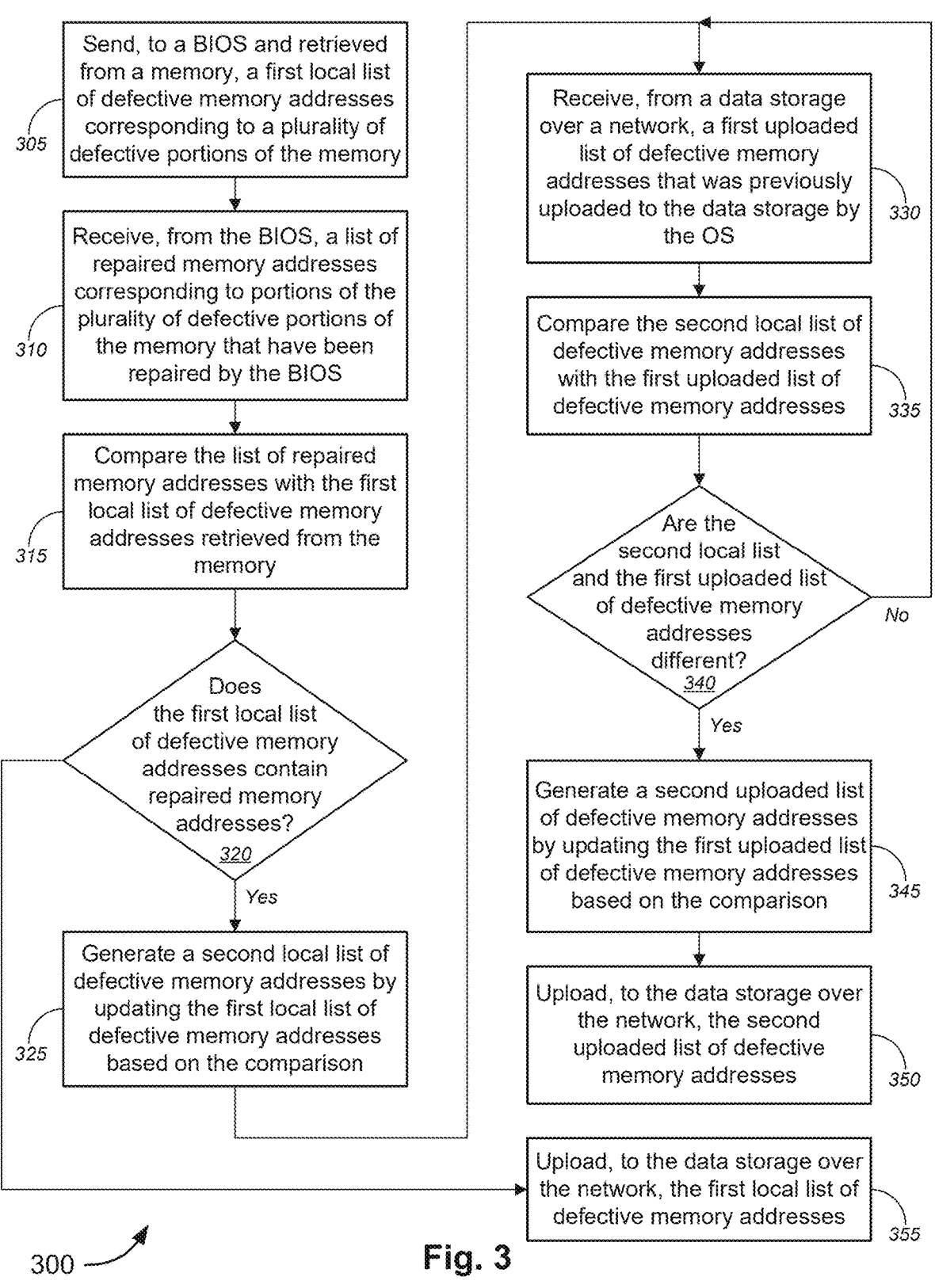

305 Send, to a BIOS and retrieved from a memory, a first local list of defective memory addresses corresponding to a plurality of defective portions of the memory 310 Receive, from the BIOS, a list of repaired memory addresses corresponding to portions of the plurality of defective portions of the memory that have been repaired by the BIOS 315 Compare the list of repaired memory addresses with the first local list of defective memory addresses retrieved from the memory 320 Does the first local list of defective memory addresses contain repaired memory addresses?

Yes

325 Generate a second local list of defective memory addresses by updating the first local list of defective memory addresses based on the comparison 330 Receive, from a data storage over a network, a first uploaded list of defective memory addresses that was previously uploaded to the data storage by the OS 335 Compare the second local list of defective memory addresses with the first uploaded list of defective memory addresses 340 Are the second local list and the first uploaded list of defective memory addresses different?

No

Yes

345 Generate a second uploaded list of defective memory addresses by updating the first uploaded list of defective memory addresses based on the comparison 350 Upload, to the data storage over the network, the second uploaded list of defective memory addresses 355 Upload, to the data storage over the network, the first local list of defective memory addresses

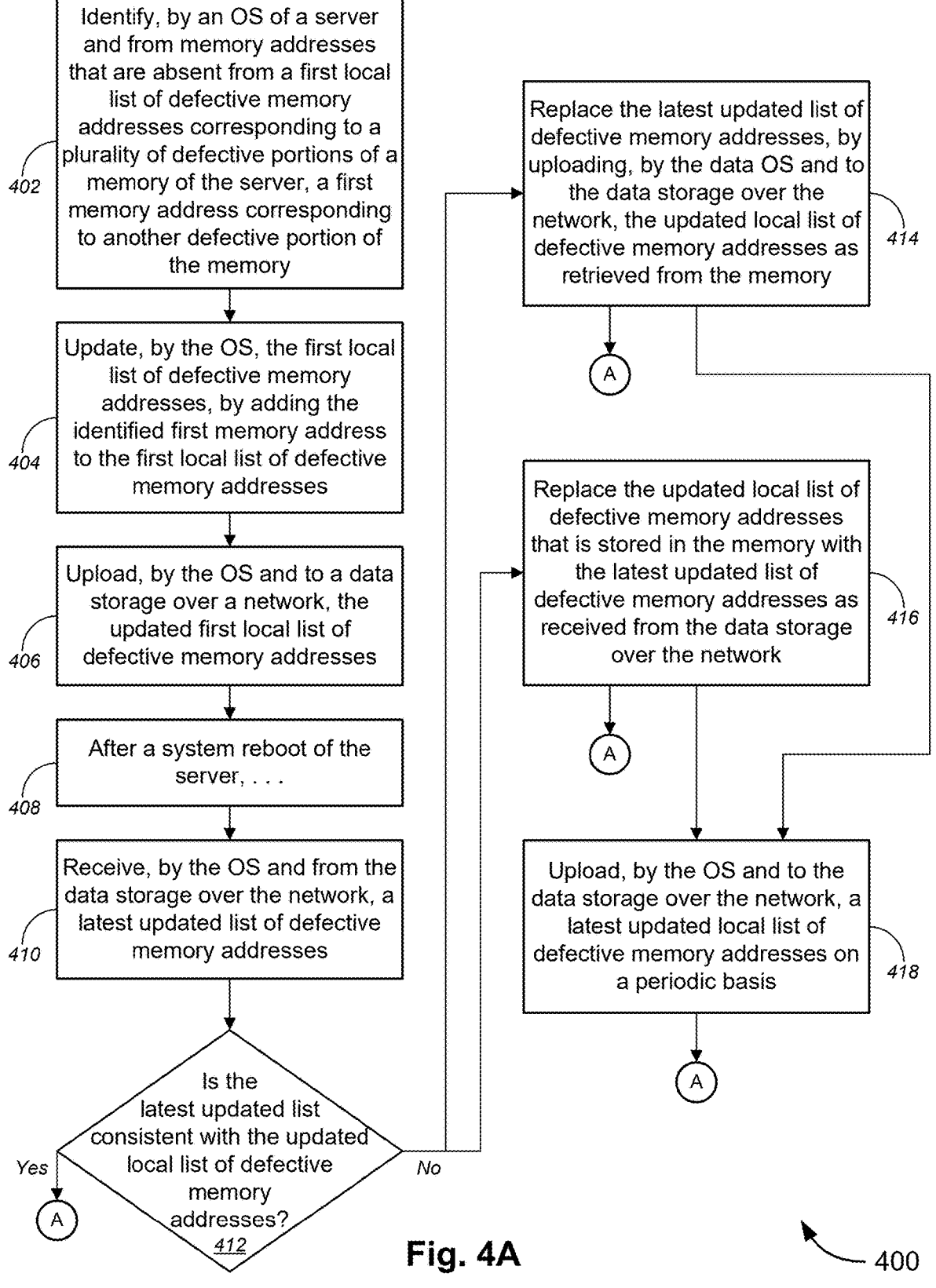
Fig. 4A      400

400

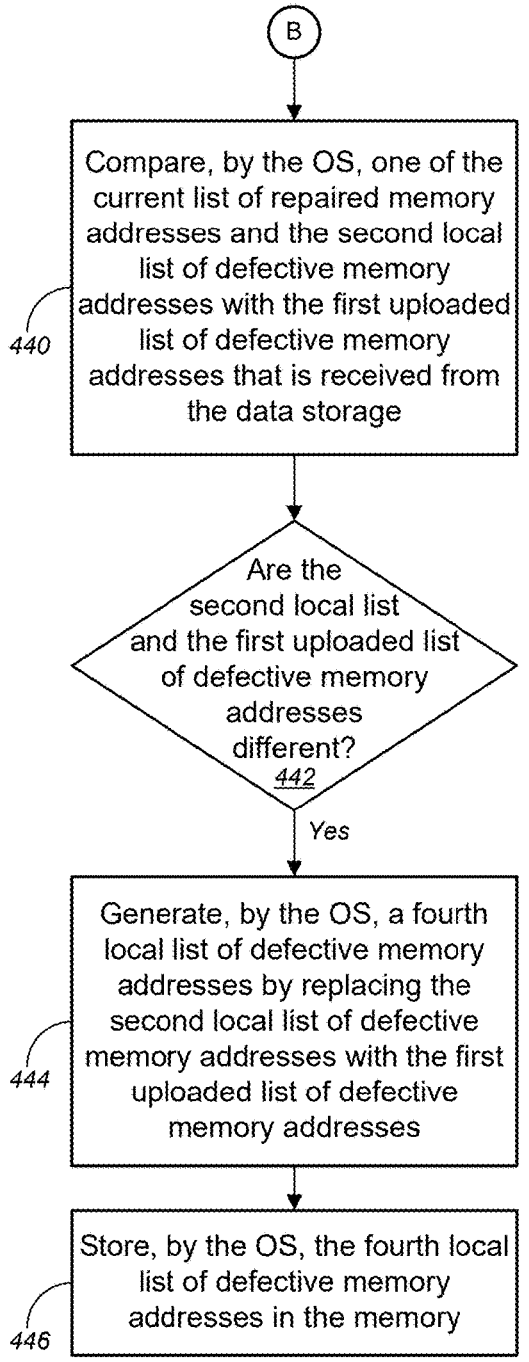

(B)

Compare, by the OS, one of the current list of repaired memory addresses and the second local list of defective memory addresses with the first uploaded list of defective memory addresses that is received from the data storage

440

Are the second local list and the first uploaded list of defective memory addresses different?
442

Yes

Generate, by the OS, a fourth local list of defective memory addresses by replacing the second local list of defective memory addresses with the first uploaded list of defective memory addresses

444

Store, by the OS, the fourth local list of defective memory addresses in the memory

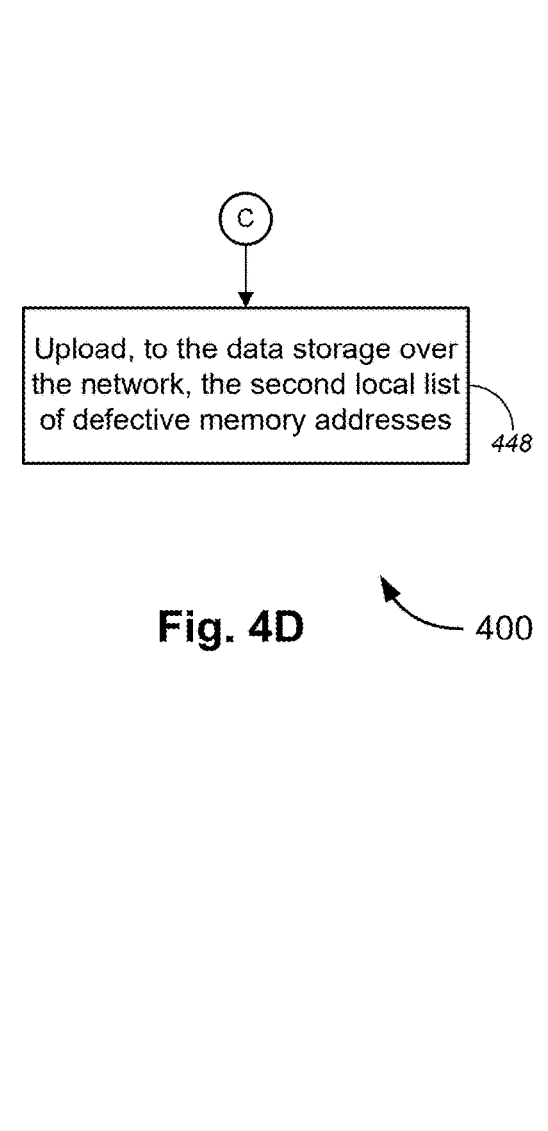

(C)

Upload, to the data storage over the network, the second local list of defective memory addresses

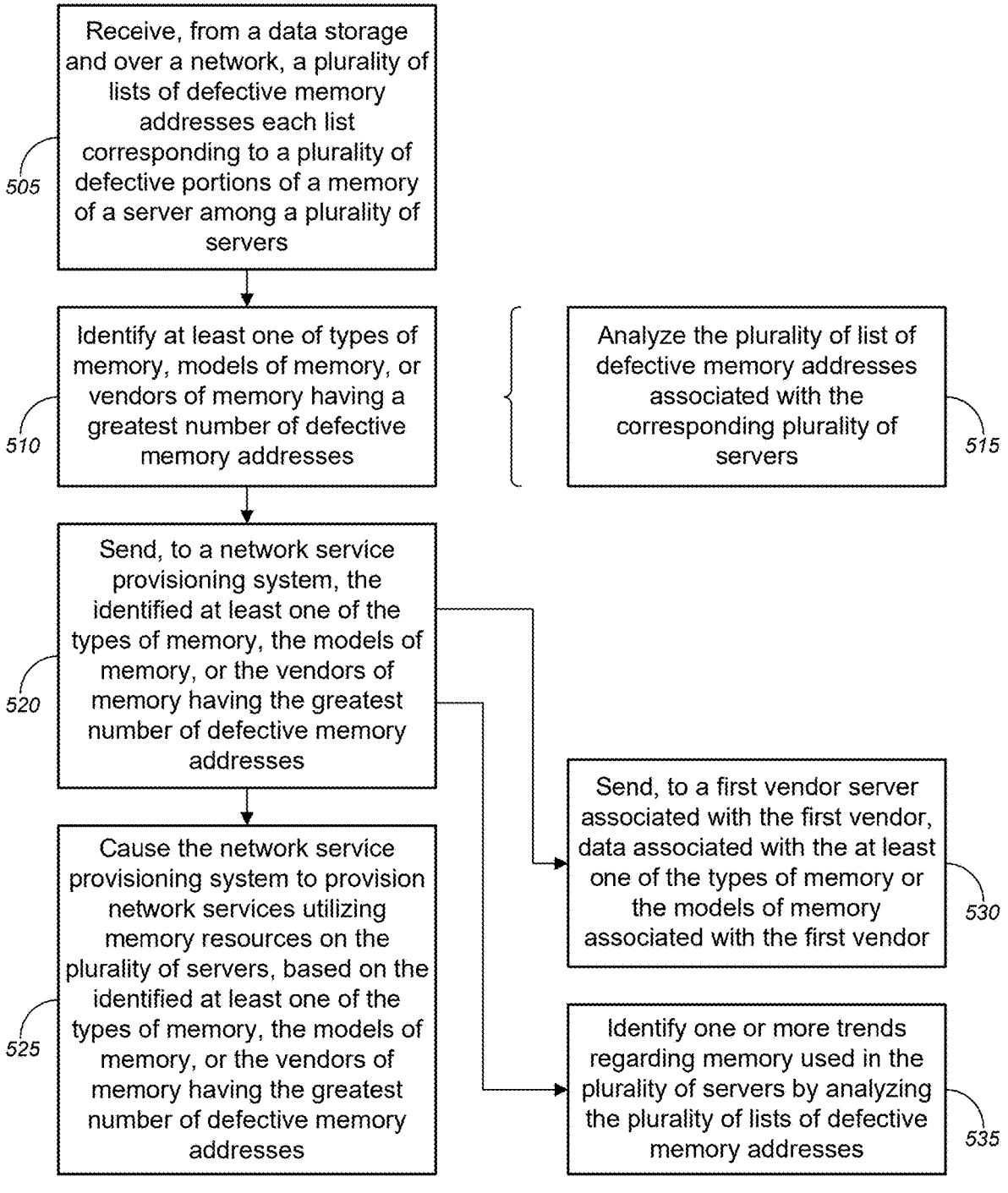

505  Receive, from a data storage and over a network, a plurality of lists of defective memory addresses each list corresponding to a plurality of defective portions of a memory of a server among a plurality of servers 510  Identify at least one of types of memory, models of memory, or vendors of memory having a greatest number of defective memory addresses 515  Analyze the plurality of list of defective memory addresses associated with the corresponding plurality of servers 520  Send, to a network service provisioning system, the identified at least one of the types of memory, the models of memory, or the vendors of memory having the greatest number of defective memory addresses 530  Send, to a first vendor server associated with the first vendor, data associated with the at least one of the types of memory or the models of memory associated with the first vendor 525  Cause the network service provisioning system to provision network services utilizing memory resources on the plurality of servers, based on the identified at least one of the types of memory, the models of memory, or the vendors of memory having the greatest number of defective memory addresses 535  Identify one or more trends regarding memory used in the plurality of servers by analyzing the plurality of lists of defective memory addresses

MEMORY DEFECT MANAGEMENT

BACKGROUND

"Bad pages" are used to identify portions of memory affected by memory errors. Operating systems utilize lists of bad pages to exclude pages or portions of memory affected by memory errors from the operating systems' active memory. Such lists, however, are not persistent between system boots, resulting in a loss of bad page lists after a system reboot. It is with respect to this general technical environment to which aspects of the present disclosure are directed. In addition, although relatively specific problems have been discussed, it should be understood that the examples should not be limited to solving the specific problems identified in the background.

SUMMARY

This summary is provided to introduce a selection of concepts in a simplified form that are further described below in the detailed description section. This summary is not intended to identify key features or essential features of the claimed subject matter, nor is it intended as an aid in determining the scope of the claimed subject matter.

The currently disclosed technology, among other things, provides for improved memory defect management. Bad pages are identified by an operating system ("OS") of a computing system (such as a server), the bad pages referring to portions of memory that are affected by memory errors such as single bit errors or multi-bit errors. A list of bad pages may be periodically uploaded to a cloud data storage. The OS may also send the list of bad pages to a basic input/output system ("BIOS") that may attempt to repair some of the bad pages, and that may send back to the OS either a list of repaired bad pages or status information regarding repair attempts of bad pages from the list of bad pages. In some examples, the list of bad pages is compared with the list of repaired bad pages and may be updated accordingly based on the comparison. Likewise, the list of bad pages may be compared with an uploaded list of bad pages that has been subsequently downloaded from the cloud data storage, and based on a determination of which list is more current or up-to-date, one list may be updated with, or replaced by, the other list. In this manner, loss of bad pages is minimized due to periodic uploading to the cloud data storage, and long lists of bad pages may be uploaded to the cloud data storage due to its large capacity, among other improvements to memory defect management as described below.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

A further understanding of the nature and advantages of particular embodiments may be realized by reference to the remaining portions of the specification and the drawings, which are incorporated in and constitute a part of this disclosure.

FIG. 3 depicts an example method for implementing improved memory defect management.

FIGS. 4A-4D depict another example method for implementing improved memory defect management.

FIG. 5 depicts yet another example method for implementing improved memory defect management.

DETAILED DESCRIPTION OF CERTAIN EMBODIMENTS

Figure 1:
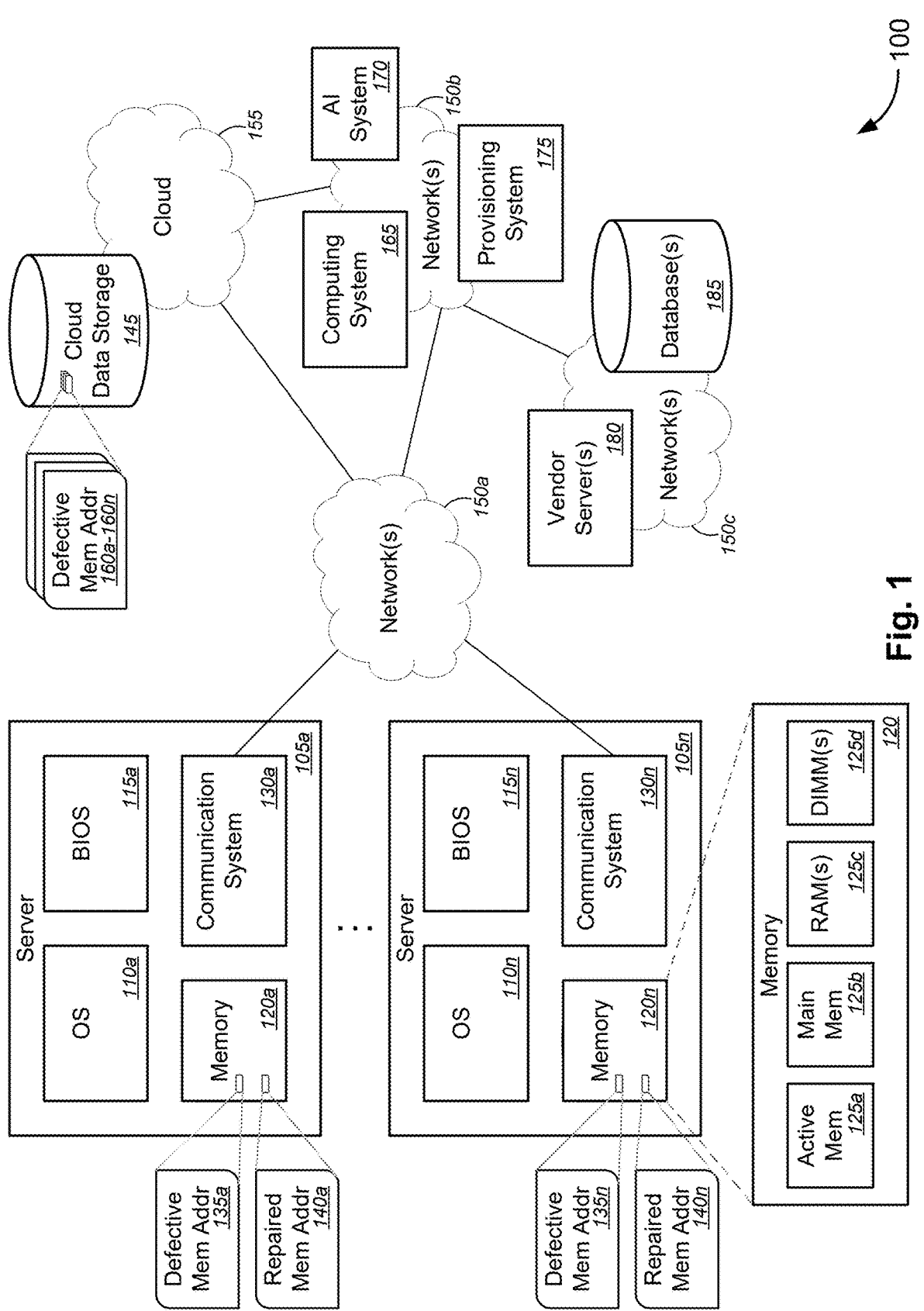
FIG. 1 depicts an example system for implementing improved memory defect management.

As briefly discussed above, portions of memory that are affected by memory errors are excluded from an OS's active memory, using lists of bad pages. Because such lists do not persistent between boots, loss of bad page lists after a system reboot will likely occur. Traditionally, system non-volatile memory is used to store bad page lists. However, loss of bad page lists (also referred to as defect lists) may occur when the system resets in an abnormal path, such as on a blue screen of death ("BSOD") critical error. In some cases, flash memory may be exhausted when the socket or dual in-line memory module ("DIMM") count increases and when the size of a bad page list can potentially be very large. In some instances, loss of bad page lists may also occur during BIOS firmware updates. In some cases, a system management interrupt ("SMI") may be required to save bad pages. SMI is used to switch from a normal mode to a system management mode ("SMM") to perform an operation. Accordingly, there is a high dependence on the SMM to write bad pages into the BIOS flash memory.

Among other things, the technology discussed herein differs from traditional memory error management. As described herein, bad page lists are periodically uploaded and saved to a cloud data storage. Long running computing systems (e.g., servers) that are up and running for many months accumulate large numbers of bad pages (e.g., 1,000's or 10,000's of bad pages, or more). Any abrupt system restart or shutdown may result in the loss of the list(s) of bad pages (e.g., the loss of 1,000's or 10,000's of bad pages, or more). The cloud data storage is also sufficiently large to store long lists of bad pages and is well-suited for providing efficient management of the long lists of bad pages. By periodically uploading and saving bad page lists to cloud data storage, loss of bad page lists is minimized, dependence on SMI and SMM for saving bad pages is reduced or obviated, BIOS flash may be reserved for storing bad pages of memory defects where memory repair is needed and thus is not needlessly overloaded, dependence on system flash memory is minimized or obviated, and DIMMs counts and multi-socket programs may be increased without overloading or exhausting memory due to corresponding increases in the number(s) and/or size(s) of bad page lists.

Various modifications and additions can be made to the embodiments discussed herein without departing from the scope of the disclosed techniques. For example, while the embodiments described above refer to particular features, the scope of the disclosed techniques also includes embodiments having different combinations of features and embodiments that do not include all of the above-described features.

Turning to the embodiments as illustrated by the drawings, FIGS. 1-5 illustrate some of the features of methods, systems, and apparatuses for implementing improved memory defect management, as referred to above. The methods, systems, and apparatuses illustrated by FIGS. 1-5 refer to examples of different embodiments that include various components and steps, which can be considered alternatives or which can be used in conjunction with one another in the various embodiments. The description of the illustrated methods, systems, and apparatuses shown in FIGS. 1-5 is provided for purposes of illustration and should not be considered to limit the scope of the different embodiments.

FIG. 1 depicts an example system 100 for implementing improved memory defect management. System 100 includes a plurality of servers 105a-105n (collectively, "servers 105"). Each server 105 includes a corresponding one of operating systems ("OSs") 110a-110n (collectively, "OSs 110"), a corresponding one of basic input/output systems ("BIOSs") 115a-115n (collectively, "BIOS 115"), a corresponding one of memory 120a-120n (collectively, "memory 120"), and a corresponding one of communication systems 130a-130n (collectively, "communication systems 130"). In examples, each memory 120 includes at least one of an active memory 125a, a main memory 125b, a random access memory ("RAM")-based memory 125c, and/or a DIMM-based memory 125d.

On each memory 120 may be stored a list of defective memory addresses 135 (e.g., one of defective memory address lists 135a-135n for corresponding one of memory devices 120a-120n or corresponding one of servers 105a-105n). In some cases, the defective memory addresses contained in a list of defective memory addresses 135 is referred to as a "bad page." As used herein, a "page" (also called to as a "memory page" or "virtual page") refers to a fixed-length contiguous block of virtual memory that represents the smallest unit of data for memory management in an OS that uses virtual memory, and that is described by a single entry in a page table. Accordingly, a defective memory address or a "bad page" refers to a portion of the memory that has memory errors, that has single bit errors, and/or that has multi-bit errors. A page table, as used herein, refers to a data structure that stores memory mappings between virtual addresses and physical addresses, where virtual addresses are used by a program that is executed by an accessing process, while physical addresses are used by the hardware, such as the memory subsystem (including RAM-based subsystem or DIMM-based subsystem). Herein, a process (such as an accessing process) refers to an instance of a program that is being executed by one or more threads of execution, each thread being a smallest sequence of programmed instructions that can be managed independently by a scheduler.

In operation, such as after system reboot of a server 105, the OS 110 of that server 105 sends either the list of defective memory addresses 135 or a subset thereof to the BIOS 115 of that server 105. The BIOS 115 may attempt to repair the defective memory addresses contained in the list of defective memory addresses 135 or in the subset of that list. Successful attempts are recorded in a list of repaired memory addresses 140 (e.g., one of repaired memory address lists 140a-140n for corresponding one of memory devices 120a-120n or corresponding one of servers 105a-105n), which is stored by the OS 110 on the corresponding memory 120. The list of defective memory addresses 135 may be updated based on the list of repaired memory addresses 140, where applicable (e.g., where the list of memory addresses 135 contains a memory address that has been repaired by the BIOS 115 as indicated in the list of repaired memory addresses 140). The updated list of defective memory addresses 135 may be uploaded to cloud data storage 145, via network(s) 150a, 150b, and/or 155 (in some cases, via communication system 130), and may be stored in cloud data storage 145 as one of a plurality of lists of defective memory addresses 160a-160n. In some cases, the cloud data storage 145 may be located within network(s) 155. In examples, each list of defective memory addresses 135 (whether updated or unchanged) may be uploaded to the cloud data storage 145 on a periodic basis (e.g., every hour, or every several hours or days). Each OS 110 may subsequently download a corresponding uploaded list of defective memory addresses 160 from the cloud data storage 145 either upon reboot of the corresponding server 105, upon request by the OS 110, or on another periodic basis (e.g., every other hour, every half a day, every several hours, or every several days). The uploaded list of defective memory addresses 160 that is received by the OS 110 may be compared with the list of defective memory addresses 135 stored in memory 120, and one may be selected over the other, or may be replaced with the other, as described below with respect to FIGS. 2-5.

In an example, OS 110a of server 105a sends the list of defective memory addresses 135a or a subset of list 135a to BIOS 115a of server 105a. Defective memory addresses that are repaired by the BIOS 115a are recorded in a list of repaired memory addresses 140a, which is stored by the OS 110a on memory 120a. Herein, the memory addresses (whether operational, defective, or repaired) refer to memory addresses of memory 120 itself (in this example, memory 120a). The list of defective memory addresses 135a may be updated based on the list of repaired memory addresses 140a, if applicable, and may be uploaded to cloud data storage 145 via network(s) 150a, 150b, and 155 (in some cases, via communication system 130a). In examples, the list of defective memory addresses 135a (whether updated or unchanged) may be uploaded to the cloud data storage 145 on a periodic basis. The uploaded list of defective memory addresses 135a may be stored as an uploaded list of defective memory addresses 160a among the plurality of lists of defective memory addresses 160a-160n. In examples, the OS 110a subsequently downloads a corresponding uploaded list of defective memory addresses 160a from the cloud data storage 145, upon reboot of server 105a, upon request by OS 110a, or on another periodic basis.

In examples, system 100 includes computing system 165 that is configured to analyze the uploaded lists of defective memory addresses 160a-160n that are stored in the cloud data storage 145. In some examples, the uploaded lists of defective memory addresses 160a-160n are analyzed to identify at least one of types of memory, models of memory, or vendors of memory having a greatest number of defective memory addresses. In some examples, the computing system 165 uses an artificial intelligence ("AI") system 170 to perform analysis of the uploaded lists of defective memory addresses 160a-160n. System 100 may further include a network service provisioning system 175. In examples, the computing system 165, the AI system 170, and/or the network service provisioning system 175 may be associated with a service provider that provisions network services including provisioning memory-based network services provided by one or more of the plurality of servers 105. In some cases, the computing system 165, the AI system 170, and/or the network service provisioning system 175 may be located within network(s) 150b. In some instances, the computing system 165 and/or the AI system 170 sends the identified at least one of the types of memory, the models of memory, or the vendors of memory having the greatest number of defective memory addresses to the network service provisioning system 175. In some examples, the computing system 165 causes the network service provisioning system 175 to provision network services utilizing memory resources on the plurality of servers, based on the identified at least one of the types of memory, the models of memory, or the vendors of memory having the greatest number of defective memory addresses.

In some examples, the identified at least one of the types of memory, the models of memory, or the vendors of memory having the greatest number of defective memory addresses include at least one of types of memory or models of memory associated with a first vendor among the vendors of memory. The computing system 165 sends, to a first vendor server (e.g., vendor server(s) 180) associated with the first vendor, data associated with the at least one of the types of memory or the models of memory associated with the first vendor. In some cases, a database(s) 185—which may be communicatively coupled to, or may be part of, the vendor server(s) 180—may be used to store the at least one of types of memory or models of memory associated with a first vendor. In examples, the vendor server(s) 180 and the database(s) 185 may be located in network(s) 150c. Networks 150a-150c (collectively, "network(s) 150") may each include at least one of a distributed computing network, such as the Internet, a private network, a commercial network, and/or a cloud network. Network(s) 155 may be a cloud network(s).

In examples, the AI system 170 may use a machine learning ("ML") model to train or update a model for identifying at least one of types of memory, models of memory, or vendors of memory having a greatest number of defective memory addresses and/or for identifying trends related to the defective memory addresses (or bad pages). In examples, the ML model includes a convolutional neural network ("CNN") model, a recurrent neural network ("RNN") model, a deep neural network ("DNN") model, a transformer model, and/or a long short-term memory network ("LSTM") model. In some instances, the model itself may be an ML model that is trained or updated by the AI system 170, or may be a language model ("LM"). In examples, the LM includes a small language model ("SLM"), a large language model ("LLM"), or other language model. As used herein, an LLM refers to a machine learning model that is trained and fine-tuned on a large corpus of media (e.g., text, audio, video, or software code), and that can be accessed and used through an application programming interface ("API") or a platform. An SLM is similar to an LLM, except that it has fewer parameters and requires less data and time to be trained. An SLM and an LLM each performs a variety of tasks, including generating and classifying media, answering user requests and questions in a conversational manner, and translating text from one language to another. Examples of LLMs (or more generally language models ("LMs")) include Bidirectional Encoder Representations from Transformers ("BERT"), Word2Vec, Global and Vectors ("GloVe"), Embeddings from Language Models ("ELMo"), XLNet, Generative Pretrained Transformer ("GPT")-3 or GPT-4, Large Language Model Meta AI ("LLaMA") 2, or BigScience Large Openscience Open-access Multilingual Language Model (BLOOM).

In operation, one or more of servers 105a-105n, one or more of OSs 110a-110n, and/or computing system 165 may perform methods for implementing improved memory defect management, as described in detail with respect to FIGS. 2-5. For example, example data flow 200 as described below with respect to FIG. 2, and example methods 300, 400, and 500 as described below with respect to FIGS. 3, 4A-4D, and 5 may be applied with respect to the operations of system 100 of FIG. 1.

Figure 2:
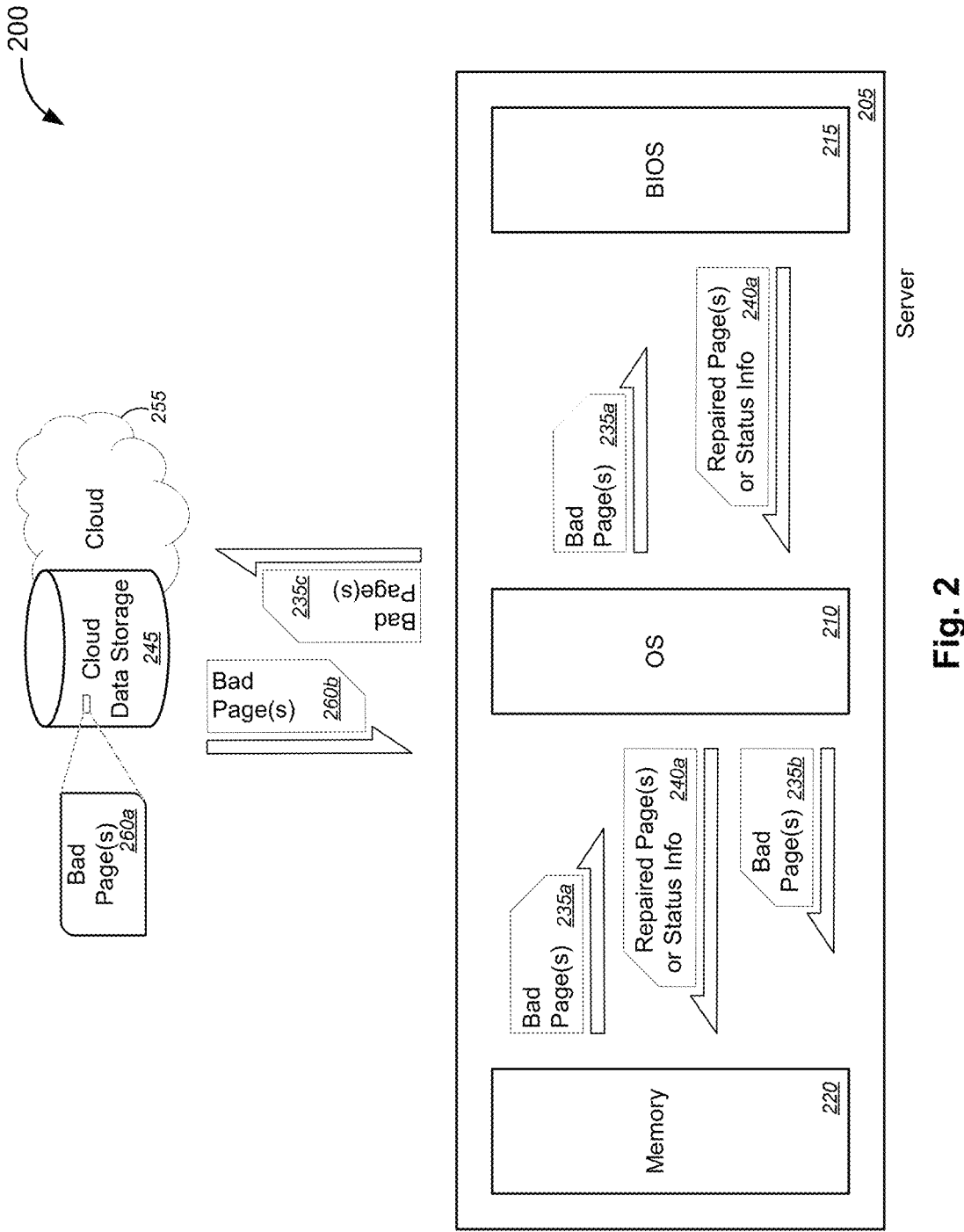
FIG. 2 depicts an example data flow when implementing improved memory defect management.

FIG. 2 depicts an example data flow 200 when implementing improved memory defect management. In some embodiments, server 205, OS 210, BIOS 215, memory 220, bad page(s) 235a-235c, repaired page(s) or status information 240a, cloud data storage 245, cloud network(s) 255, and bad page(s) 260a and 260b of FIG. 2 may be similar, if not identical, to the servers 105a-105n, OSs 110a-110n, BIOSs 115a-115n, memory devices 120a-120n, defective memory address lists 135a-135n, repaired memory address lists 140a-140n, cloud data storage 145, network(s) 155, and lists of defective memory addresses 160a-160n, respectively, of system 100 of FIG. 1, and the description of these components of system 100 of FIG. 1 are similarly applicable to the corresponding components of FIG. 2.

With reference to FIG. 2, in example data flow 200, OS 210 receives a list of bad pages 235a from memory 220, and sends the list of bad pages 235a to BIOS 215, in some cases, after a system reboot of the server 205. The BIOS 215 may return a list of repaired pages or status information 240a. After receiving the list of repaired pages or status information 240a, the OS 210 either stores the list of repaired pages or status information 240a in memory 220 and/or compares the list of bad pages 235a with the list of repaired pages or status information 240a. In examples, the OS 210 determines whether the list of bad pages 235a contains bad pages that are indicated by the list of repaired pages or status information 240a as having been repaired. If so, the OS 210 updates the list of bad pages 235 to remove the repaired pages, and generates an updated list of bad pages 235b. The OS 210 may then store the updated list of bad pages 235b in memory 220. On a periodic basis or by action of the OS 210, a list of bad pages 235c (which may be one of the list of bad pages 235a or the updated list of bad pages 235b) may be uploaded to cloud data storage 245 via cloud network(s) 255. Once received by cloud data storage 245, the list of bad pages 235c may be stored as an uploaded list of bad pages 260a. In examples, upon reboot of server 205, upon request by the OS 210, or on another periodic basis, a list of bad pages 260b (which may correspond to the uploaded list of bad pages 260a) may be downloaded or otherwise received by the OS 210. In some examples, the OS 210 determines whether the list of bad pages 260b is consistent with the list of bad pages 235a or 235b that is stored in the memory.

Based on a determination that the list of bad pages 260b is consistent with the list of bad pages 235a or 235b, the OS 210 either (A) replaces the list of bad pages 260b, by uploading, to the cloud data storage 245, the list of bad pages 235a or 235b as retrieved from the memory 220; or (B) replaces the list of bad pages 235a or 235b that is stored in the memory 220 with the list of bad pages 260b as received from the cloud data storage 245. In examples, replacing the list of bad pages 260b is performed based on a determination that the list of bad pages 235b has been updated with the repaired page(s) or status information 240a corresponding to portions of the plurality of defective portions of the memory 220 that have been repaired by the BIOS 215. Alternatively, replacing the list of bad pages 235a is performed based on a determination that the list of bad pages 235a that is stored in the memory 220 remains unchanged after receiving the repaired page(s) or status information 240a from the BIOS 215.

These and other functions of the example data flow 200 (and the components described with respect to FIG. 2) are described in greater detail herein with respect to FIGS. 1, 3, 4A-4D, and 5.

With reference to FIGS. 3 and 4A-4D, the operations of example methods 300 and 400, respectively, may be performed by an OS of the server (e.g., OSs 110a-110n or 210 of FIGS. 1 and 2). In some examples, the memory referred to in FIGS. 3 and 4A-4D includes at least one of an active memory, a main memory, or a RAM. Referring to FIG. 5, the operations of example method 500 may be performed by a computing system of a service provider (e.g., computing system 165 and/or AI system 170 of FIG. 1).

FIG. 3 depicts an example method 300 for implementing improved memory defect management. In the example of FIG. 3, method 300, at operation 305, includes the OS sending, to a BIOS and retrieved from the memory, a first local list of defective memory addresses corresponding to a plurality of defective portions of the memory. At operation 310, the OS receives, from the BIOS, a list of repaired memory addresses corresponding to portions of the plurality of defective portions of the memory that have been repaired by the BIOS. In examples, sending the first local list of defective memory addresses to the BIOS (at operation 305) and receiving the first uploaded list of defective memory addresses (at operation 310) are performed after a system reboot of the server. In some examples, the plurality of defective portions includes at least one of a portion of the memory that has memory errors, a portion of the memory that has single bit errors, or a portion of the memory that has multi-bit errors.

Method 300 further includes the OS comparing the list of repaired memory addresses with the first local list of defective memory addresses retrieved from the memory (at operation 315). At operation 320, the OS determines whether the first local list of defective memory addresses lists repaired memory addresses contained in the list of repaired memory addresses. Based on a determination that the first local list of defective memory addresses lists repaired memory addresses contained in the list of repaired memory addresses, method 300 continues onto the process at operation 325. Based on a determination that the first local list of defective memory addresses does not list repaired memory addresses contained in the list of repaired memory addresses, method 300 continues onto the process at operation 355.

At operation 325, where the first local list of defective memory addresses lists repaired memory addresses contained in the list of repaired memory addresses, the OS generates a second local list of defective memory addresses by updating the first local list of defective memory addresses based on the comparison (from operation 315). Method 300 further includes the OS receiving, from a data storage over a network, a first uploaded list of defective memory addresses that was previously uploaded to the data storage by the OS (at operation 330). In examples, receiving the first uploaded list of defective memory addresses (at operation 330) or a subsequent uploaded list of defective memory addresses is one of performed upon reboot of the server, performed upon request by the OS, or performed on a periodic basis.

At operation 335, the OS compares the second local list of defective memory addresses with the first uploaded list of defective memory addresses. Method 300 further includes, at operation 340, the OS determines whether the second local list of defective memory addresses is different from the first uploaded list of defective memory addresses. Based on a determination that the second local list of defective memory addresses is different from the first uploaded list of defective memory addresses, method 300 continues onto the process at operation 345. Based on a determination that the second local list of defective memory addresses and the first uploaded list of defective memory addresses contain the same memory addresses (e.g., contain matching memory addresses), method 300 returns to the process at operation 330.

At operation 345, based on a determination that the second local list of defective memory addresses is different from the first uploaded list of defective memory addresses, the OS generates a second uploaded list of defective memory addresses by updating the first uploaded list of defective memory addresses based on the comparison (from operation 335). Method 300, at operation 350, further includes uploading the second uploaded list of defective memory addresses to the data storage over the network.

At operation 355, based on a determination that the first local list of defective memory addresses does not list repaired memory addresses contained in the list of repaired memory addresses (from operation 320), the OS uploads, to the data storage over the network, the first local list of defective memory addresses. In examples, the OS may upload updated lists of defective memory addresses on a periodic basis (e.g., every hour, or every several hours or days) to the data storage over the network.

Figure 4B:
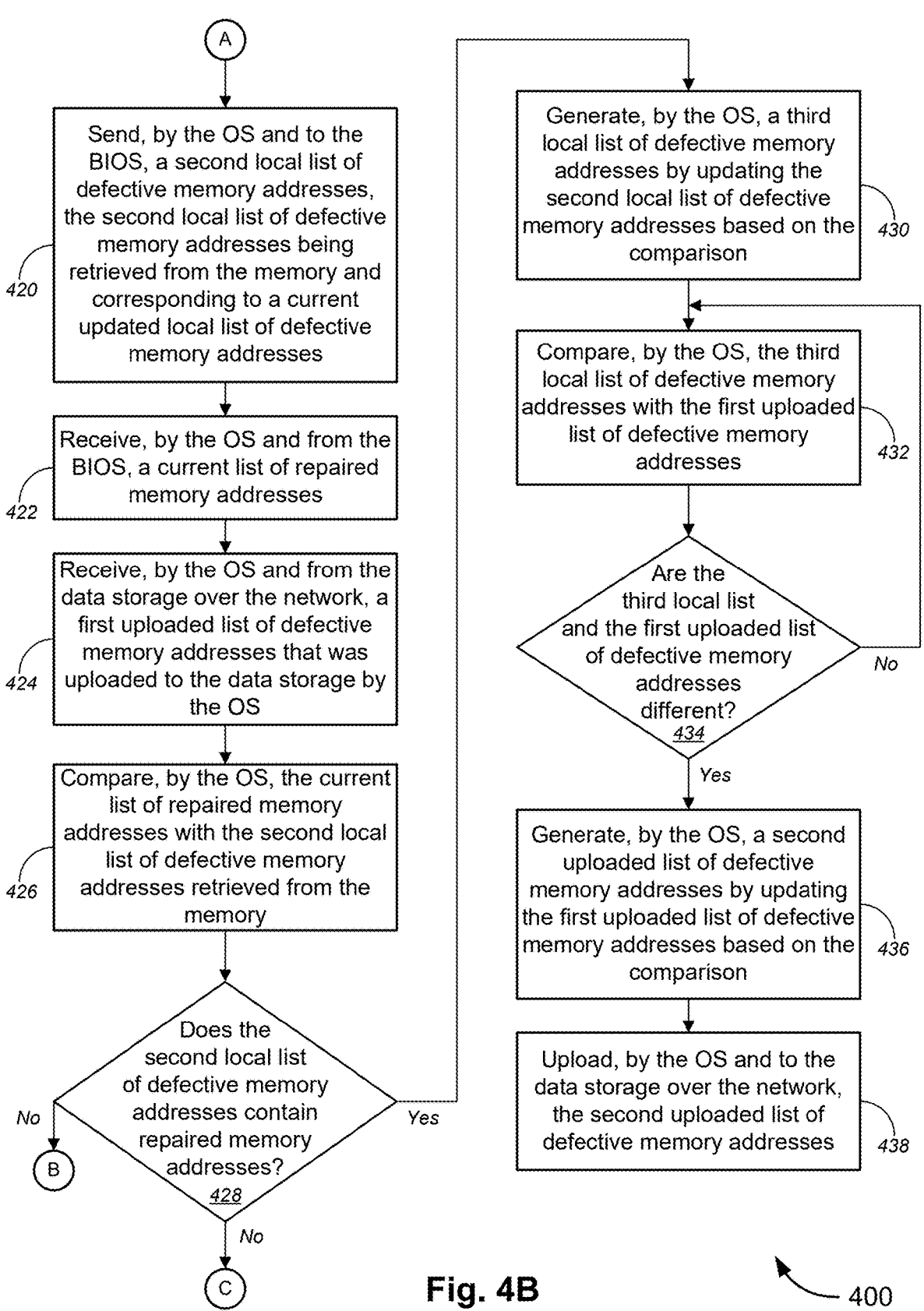

FIGS. 4A-4D depict another example method 400 for implementing improved memory defect management. In the example of FIG. 4A, method 400, at operation 402, includes an OS of a server identifying, from memory addresses that are absent from a first local list of defective memory addresses corresponding to a plurality of defective portions of a memory of the server, a first memory address corresponding to another defective portion of the memory. The first local list of defective memory addresses is stored in the memory. Method 400 further includes the OS updating the first local list of defective memory addresses, by adding the identified first memory address to the first local list of defective memory addresses (at operation 404). At operation 406, the OS uploads, to a data storage over a network, the updated first local list of defective memory addresses. In examples, identifying the first memory address (at operation 402) is performed using a cyclic redundancy check.

At operation 408, after a system reboot of the server, method 400 includes at least the processes at operations 410-418. Method 400 further includes, at operation 410, the OS receiving, from the data storage over the network, a latest updated list of defective memory addresses. Method 400 further includes the OS determining whether the latest updated list of defective memory addresses is consistent with the updated local list of defective memory addresses that is stored in the memory (at operation 412). Based on a determination that the latest updated list of defective memory addresses is consistent with the updated local list of defective memory addresses that is stored in the memory, method 400 continues onto the process at operation 420 in FIG. 4B following the circular marker denoted, "A." Based on a determination that the latest updated list of defective memory addresses is inconsistent with the updated local list of defective memory addresses that is stored in the memory, the OS performs one of the process at operation 414 or the process at operation 416.

At operation 414, the OS replaces the latest updated list of defective memory addresses, by uploading, to the data storage over the network, the updated local list of defective memory addresses as retrieved from the memory. In examples, replacing the latest updated list of defective memory addresses (at operation 414) is performed based on a determination that the updated local list of defective memory addresses that is stored in the memory has been updated with a list of repaired memory addresses corresponding to portions of the plurality of defective portions of the memory that have been repaired by a BIOS. Alternatively or additionally, at operation 416, the OS replaces the updated local list of defective memory addresses that is stored in the memory with the latest updated list of defective memory addresses as received from the data storage over the network. In some examples, replacing the updated local list of defective memory addresses (at operation 416) is performed based on a determination that the updated local list of defective memory addresses that is stored in the memory remains unchanged after receiving memory repair status information from the BIOS. Following the process at each of operations 414 and 416, method 400 either continues onto the process at operation 418 or continues onto the process at operation 420 in FIG. 4B following the circular marker denoted, "A." At operation 418, the OS uploads, to the data storage over the network, a latest updated local list of defective memory addresses on a periodic basis. Method 400 continues onto the process at operation 420 in FIG. 4B following the circular marker denoted, "A."

At operation 420 in FIG. 4B (following the circular marker denoted, "A," in FIG. 4A), method 400 includes the OS sending, to the BIOS, a second local list of defective memory addresses, the second local list of defective memory addresses being retrieved from the memory and corresponding to a current updated local list of defective memory addresses. Method 400, at operation 422, the OS receives, from the BIOS, a current list of repaired memory addresses. Method 400 further includes the OS receiving, from the data storage over the network, a first uploaded list of defective memory addresses that was uploaded to the data storage by the OS (at operation 424). Method 400 further includes the OS compares the current list of repaired memory addresses with the second local list of defective memory addresses retrieved from the memory (at operation 426). At operation 428, the OS determines whether the second local list of defective memory addresses lists repaired memory addresses contained in the current list of repaired memory addresses. Based on a determination that the second local list of defective memory addresses lists repaired memory addresses contained in the current list of repaired memory addresses, method 400 continues onto the process at operation 430. Based on a determination that the second local list of defective memory addresses does not list repaired memory addresses contained in the current list of repaired memory addresses, method 400 either continues onto the process at operation 440 following the circular marker denoted, "B," or continues onto the process at operation 448 following the circular marker denoted, "C."

At operation 430, the OS generates a third local list of defective memory addresses by updating the second local list of defective memory addresses based on the comparison (from operation 424). At operation 432, the OS compares the third local list of defective memory addresses with the first uploaded list of defective memory addresses. Method 400 further includes, at operation 434, the OS determines whether the third local list of defective memory addresses is different from the first uploaded list of defective memory addresses. Based on a determination that the third local list of defective memory addresses is different from the first uploaded list of defective memory addresses, method 400 continues onto the process at operation 436. Based on a determination that the third local list of defective memory addresses and the first uploaded list of defective memory addresses contain the same memory addresses (e.g., contain matching memory addresses), method 300 returns to the process at operation 432.

At operation 436, based on a determination that the third local list of defective memory addresses is different from the first uploaded list of defective memory addresses, the OS generates a second uploaded list of defective memory addresses by updating the first uploaded list of defective memory addresses based on the comparison (from operation 432). Method 400, at operation 438, further includes the OS uploading the second uploaded list of defective memory addresses to the data storage over the network.

At operation 440 in FIG. 4C (following the circular marker denoted, "B," in FIG. 4B), method 400 includes, based on a determination that the second local list of defective memory addresses does not list repaired memory addresses contained in the current list of repaired memory addresses (from operation 426), the OS compares one of the current list of repaired memory addresses and the second local list of defective memory addresses with the first uploaded list of defective memory addresses that is received from the data storage. Method 400 further includes, at operation 442, the OS determines whether the one of the current list of repaired memory addresses and the second local list of defective memory addresses is different from the first uploaded list of defective memory addresses (received from operation 424). Based on a determination that the one of the current list of repaired memory addresses and the second local list of defective memory addresses is different from the first uploaded list of defective memory addresses, the OS generates a fourth local list of defective memory addresses by replacing the second local list of defective memory addresses with the first uploaded list of defective memory addresses (at operation 444). At operation 446, the OS stores the fourth local list of defective memory addresses in the memory.

At operation 448 in FIG. 4D (following the circular marker denoted, "C," in FIG. 4B), method 400 includes, based on a determination that the second local list of defective memory addresses does not list repaired memory addresses contained in the current list of repaired memory addresses (from operation 426), the OS uploads the second local list of defective memory addresses to the data storage over the network.

FIG. 5 depicts yet another example method 500 for implementing improved memory defect management. In the example of FIG. 5, method 500, at operation 505, includes the computing system receives, from a data storage and over a network, a plurality of lists of defective memory addresses each list corresponding to a plurality of defective portions of a memory of a server among a plurality of servers. At operation 510, the computing system identifies at least one of types of memory, models of memory, or vendors of memory having a greatest number of defective memory addresses, in some cases, by analyzing the plurality of list of defective memory addresses associated with the corresponding plurality of servers (at operation 515). Method 500, at operation 520, further includes the computing system sending, to a network service provisioning system, the identified at least one of the types of memory, the models of memory, or the vendors of memory having the greatest number of defective memory addresses. In examples, each of the plurality of lists of defective memory addresses is periodically uploaded to the data storage from a corresponding one of the plurality of servers.

Method 500 continues onto one or more of the processes at operations 525-535. At operation 525, method 500 includes the computing system causing a network service provisioning system (e.g., network service provisioning system 175 of FIG. 1) to provision network services utilizing memory resources on the plurality of servers, based on the identified at least one of the types of memory, the models of memory, or the vendors of memory having the greatest number of defective memory addresses. In examples, the identified at least one of the types of memory, the models of memory, or the vendors of memory having the greatest number of defective memory addresses include at least one of types of memory or models of memory associated with a first vendor among the vendors of memory. At operation 530, method 500 includes the computing system sending, to a first vendor server associated with the first vendor, data associated with the at least one of the types of memory or the models of memory associated with the first vendor. Alternatively or additionally, at operation 535, method 500 includes the computing system identifying one or more trends regarding memory used in the plurality of servers by analyzing the plurality of lists of defective memory addresses.

While the techniques and procedures in methods 300-500 are depicted and/or described in a certain order for purposes of illustration, it should be appreciated that certain procedures may be reordered and/or omitted within the scope of various embodiments. Moreover, while the methods 300-500 may be implemented by or with (and, in some cases, are described below with respect to) the systems, examples, or embodiments 100 and 200 of FIGS. 1 and 2, respectively (or components thereof), such methods may also be implemented using any suitable hardware (or software) implementation. Similarly, while each of the systems, examples, or embodiments 100 and 200 of FIGS. 1 and 2, respectively (or components thereof), can operate according to the methods 300-500 (e.g., by executing instructions embodied on a computer readable medium), the systems, examples, or embodiments 100 and 200 of FIGS. 1 and 2 can each also operate according to other modes of operation and/or perform other suitable procedures.

As should be appreciated from the foregoing, the present technology provides multiple technical benefits and solutions to technical problems. For instance, managing memory error in memory generally raises multiple technical problems. For instance, one technical problem includes loss of bad page lists or defect lists when a system resets in an abnormal path (e.g., on a BSOD error). Another technical problem includes exhausting local memory (e.g., flash memory) when socket or DIMM counts increase, which may increase a corresponding size of bad page lists or defect lists beyond a capacity of the local memory. In some cases, loss of bad page lists may occur on BIOS firmware updates. Existing systems depend on system non-volatile memory size, and require SMI to store bad pages in system non-volatile memory. Existing systems lack a recovery mechanism upon BIOS update and upon hardware change or replacement. The present technology provides an improved memory error management approach that provides for periodically uploading and saving bad page lists to a cloud data storage, thus providing for a highly flexible approach to storing bad page lists. The cloud data storage is also sufficiently large to store long lists of bad pages and is well-suited for providing efficient management of the long lists of bad pages. By periodically uploading and saving bad page lists to cloud data storage, loss of bad page lists is minimized, dependence on SMI and SMM for saving bad pages is reduced or obviated, BIOS flash may be reserved for storing bad pages of memory defects where memory repair is needed and thus is not needlessly overloaded, dependence on system flash memory is minimized or obviated, and DIMMs counts and multi-socket programs may be increased without overloading or exhausting memory due to corresponding increases in the number(s) and/or size(s) of bad page lists. Also, the present technology is not dependent on system non-volatile memory and its size, nor does it require SMI to store bad page lists, and loss of bad page lists is minimized or obviated even upon system update and hardware changes.

Figure 6:
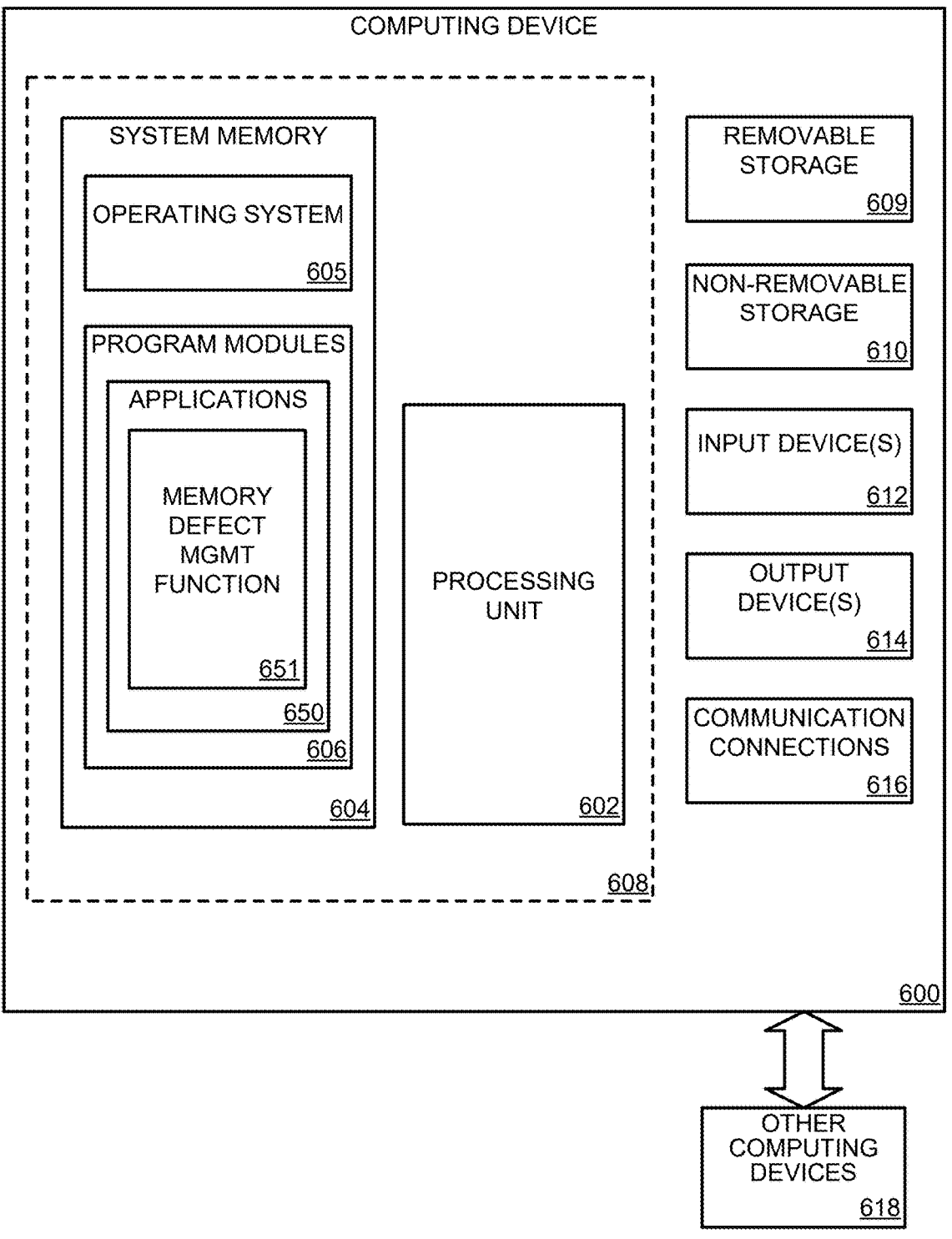
FIG. 6 depicts a block diagram illustrating example physical components of a computing device with which aspects of the technology may be practiced.

FIG. 6 depicts a block diagram illustrating physical components (i.e., hardware) of a computing device 600 with which examples of the present disclosure may be practiced. The computing device components described below may be suitable for a client device implementing the improved memory defect management, as discussed above. In a basic configuration, the computing device 600 may include at least one processing unit 602 and a system memory 604. The processing unit(s) (e.g., processors) may be referred to as a processing system. Depending on the configuration and type of computing device, the system memory 604 may include volatile storage (e.g., random access memory), non-volatile storage (e.g., read-only memory), flash memory, or any combination of such memories. The system memory 604 may include an operating system 605 and one or more program modules 606 suitable for running software applications 650, such as memory defect management function 651, to implement one or more of the systems or methods described above.

The operating system 605, for example, may be suitable for controlling the operation of the computing device 600. Furthermore, aspects of the invention may be practiced in conjunction with a graphics library, other operating systems, or any other application program and is not limited to any particular application or system. This basic configuration is illustrated in FIG. 6 by those components within a dashed line 608. The computing device 600 may have additional features or functionalities. For example, the computing device 600 may also include additional data storage devices (which may be removable and/or non-removable), such as, for example, magnetic disks, optical disks, or tape. Such additional storage is illustrated in FIG. 6 by a removable storage device(s) 609 and a non-removable storage device(s) 610.

As stated above, a number of program modules and data files may be stored in the system memory 604. While executing on the processing unit 602, the program modules 606 may perform processes including one or more of the operations of the method(s) as illustrated in FIGS. 3-5, or one or more operations of the system(s) and/or apparatus(es) as described with respect to FIGS. 1 and 2, or the like. Other program modules that may be used in accordance with examples of the present disclosure may include applications such as electronic mail and contacts applications, word processing applications, spreadsheet applications, database applications, slide presentation applications, drawing or computer-aided application programs, AI applications and ML modules on cloud-based systems, etc.

Furthermore, examples of the present disclosure may be practiced in an electrical circuit including discrete electronic elements, packaged or integrated electronic chips containing logic gates, a circuit utilizing a microprocessor, or on a single chip containing electronic elements or microprocessors. For example, examples of the present disclosure may be practiced via a system-on-a-chip ("SOC") where each or many of the components illustrated in FIG. 6 may be integrated onto a single integrated circuit. Such an SOC device may include one or more processing units, graphics units, communications units, system virtualization units and various application functionalities all of which may be integrated (or "burned") onto the chip substrate as a single integrated circuit. When operating via an SOC, the functionality, described herein, with respect to generating suggested queries, may be operated via application-specific logic integrated with other components of the computing device 600 on the single integrated circuit (or chip). Examples of the present disclosure may also be practiced using other technologies capable of performing logical operations such as, for example, AND, OR, and NOT, including mechanical, optical, fluidic, and/or quantum technologies.

The computing device 600 may also have one or more input devices 612 such as a keyboard, a mouse, a pen, a sound input device, and/or a touch input device, etc. The output device(s) 614 such as a display, speakers, and/or a printer, etc. may also be included. The aforementioned devices are examples and others may be used. The computing device 600 may include one or more communication connections 616 allowing communications with other computing devices 618. Examples of suitable communication connections 616 include radio frequency ("RF") transmitter, receiver, and/or transceiver circuitry; universal serial bus ("USB"), parallel, and/or serial ports; and/or the like.

The term "computer readable media" as used herein may include computer storage media. Computer storage media may include volatile and nonvolatile, and/or removable and non-removable, media that may be implemented in any method or technology for storage of information, such as computer readable instructions, data structures, or program modules. The system memory 604, the removable storage device 609, and the non-removable storage device 610 are all computer storage media examples (i.e., memory storage). Computer storage media may include random access memory ("RAM"), read-only memory ("ROM"), electrically erasable programmable read-only memory ("EE-PROM"), flash memory or other memory technology, compact disk read-only memory ("CD-ROM"), digital versatile disks ("DVD") or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media may be non-transitory and tangible, and computer storage media do not include a carrier wave or other propagated data signal.

Communication media may be embodied by computer readable instructions, data structures, program modules, or other data in a modulated data signal, such as a carrier wave or other transport mechanism, and may include any information delivery media. The term "modulated data signal" may describe a signal that has one or more characteristics that are set or changed in such a manner as to encode information in the signal. By way of example, communication media may include wired media such as a wired network or direct-wired connection, and wireless media such as acoustic, RF, infrared, and other wireless media.

In this detailed description, wherever possible, the same reference numbers are used in the drawing and the detailed description to refer to the same or similar elements. In some instances, a sub-label is associated with a reference numeral to denote one of multiple similar components. When reference is made to a reference numeral without specification to an existing sub-label, it is intended to refer to all such multiple similar components. In some cases, for denoting a plurality of components, the suffixes "a" through "n" may be used, where n denotes any suitable non-negative integer number (unless it denotes the number 14, if there are components with reference numerals having suffixes "a" through "m" preceding the component with the reference numeral having a suffix "n"), and may be either the same or different from the suffix "n" for other components in the same or different figures. For example, for component #1 X05$a$-X05$n$, the integer value of n in X05$n$ may be the same or different from the integer value of n in X10$n$ for component #2 X10$a$-X10$n$, and so on. In other cases, other suffixes (e.g., s, t, u, v, w, x, y, and/or z) may similarly denote non-negative integer numbers that (together with n or other like suffixes) may be either all the same as each other, all different from each other, or some combination of same and different (e.g., one set of two or more having the same values with the others having different values, a plurality of sets of two or more having the same value with the others having different values).

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components including one unit and elements and components that include more than one unit, unless specifically stated otherwise.

In this detailed description, for the purposes of explanation, numerous specific details are set forth to provide a thorough understanding of the described embodiments. It will be apparent to one skilled in the art, however, that other embodiments of the present invention may be practiced without some of these specific details. In other instances, certain structures and devices are shown in block diagram form. While aspects of the technology may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the detailed description does not limit the technology, but instead, the proper scope of the technology is defined by the appended claims. Examples may take the form of a hardware implementation, or an entirely software implementation, or an implementation combining software and hardware aspects. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features. The detailed description is, therefore, not to be taken in a limiting sense.

Aspects of the present invention, for example, are described above with reference to block diagrams and/or operational illustrations of methods, systems, and computer program products according to aspects of the invention. The functions and/or acts noted in the blocks may occur out of the order as shown in any flowchart. For example, two blocks shown in succession may in fact be executed substantially concurrently or the blocks may sometimes be executed in the reverse order, depending upon the functionalities and/or acts involved. Further, as used herein and in the claims, the phrase "at least one of element A, element B, or element C" (or any suitable number of elements) is intended to convey any of: element A, element B, element C, elements A and B, elements A and C, elements B and C, and/or elements A, B, and C (and so on).

The description and illustration of one or more aspects provided in this application are not intended to limit or restrict the scope of the invention as claimed in any way. The aspects, examples, and details provided in this application are considered sufficient to convey possession and enable others to make and use the best mode of the claimed invention. The claimed invention should not be construed as being limited to any aspect, example, or detail provided in this application. Regardless of whether shown and described in combination or separately, the various features (both structural and methodological) are intended to be selectively rearranged, included, or omitted to produce an example or embodiment with a particular set of features. Having been provided with the description and illustration of the present application, one skilled in the art may envision variations, modifications, and alternate aspects, examples, and/or similar embodiments falling within the spirit of the broader aspects of the general inventive concept embodied in this application that do not depart from the broader scope of the claimed invention.

What is claimed is:

1. A server, comprising:
a basic input/output system ("BIOS");
a memory; and
an operating system ("OS") that executes computer executable instructions that cause the OS to perform operations comprising:
sending, to the BIOS and retrieved from the memory, a first local list of defective memory addresses corresponding to a plurality of defective portions of the memory;
receiving, from the BIOS, a list of repaired memory addresses corresponding to portions of the plurality of defective portions of the memory that have been repaired by the BIOS;
comparing the list of repaired memory addresses with the first local list of defective memory addresses retrieved from the memory;
based on a determination that the first local list of defective memory addresses lists repaired memory addresses contained in the list of repaired memory addresses, generating a second local list of defective memory addresses by updating the first local list of defective memory addresses based on the comparison;
receiving, from a data storage over a network, a first uploaded list of defective memory addresses that was previously uploaded to the data storage by the OS;
comparing the second local list of defective memory addresses with the first uploaded list of defective memory addresses; and
based on a determination that the second local list of defective memory addresses is different from the first uploaded list of defective memory addresses,

16 generating a second uploaded list of defective memory addresses by updating the first uploaded list of defective memory addresses based on the comparison, and
uploading, to the data storage over the network, the second uploaded list of defective memory addresses.

2. The server of claim 1, wherein sending the first local list of defective memory addresses to the BIOS and receiving the first uploaded list of defective memory addresses are performed after a system reboot of the server.

3. The server of claim 1, wherein the plurality of defective portions includes at least one of a portion of the memory that has memory errors, a portion of the memory that has single bit errors, or a portion of the memory that has multi-bit errors.

4. The server of claim 1, wherein the memory includes at least one of an active memory, a main memory, or a random access memory ("RAM").

5. The server of claim 1, wherein the operations further comprise:
uploading, to the data storage over the network, updated lists of defective memory addresses on a periodic basis.

6. The server of claim 1, wherein receiving the first uploaded list of defective memory addresses or a subsequent uploaded list of defective memory addresses is one of performed upon reboot of the server, performed upon request by the OS, or performed on a periodic basis.

7. A computer-implemented method, comprising:
identifying, by an operating system ("OS") of a server and from memory addresses that are absent from a first local list of defective memory addresses corresponding to a plurality of defective portions of a memory of the server, a first memory address corresponding to another defective portion of the memory, the first local list of defective memory addresses being stored in the memory;
updating, by the OS, the first local list of defective memory addresses, by adding the identified first memory address to the first local list of defective memory addresses;
uploading, by the OS and to a data storage over a network, the updated first local list of defective memory addresses; and
after a system reboot of the server,
receiving, by the OS and from the data storage over the network, a latest updated list of defective memory addresses;
determining, by the OS, whether the latest updated list of defective memory addresses is consistent with the updated local list of defective memory addresses that is stored in the memory; and
based on a determination that the latest updated list of defective memory addresses is inconsistent with the updated local list of defective memory addresses that is stored in the memory, performing one of:
replacing the latest updated list of defective memory addresses, by uploading, by the OS and to the data storage over the network, the updated local list of defective memory addresses as retrieved from the memory; or
replacing the updated local list of defective memory addresses that is stored in the memory with the latest updated list of defective memory addresses as received from the data storage over the network.

8. The computer-implemented method of claim 7, wherein the memory includes at least one of an active memory, a main memory, or a random access memory ("RAM").

9. The computer-implemented method of claim 7, wherein identifying the first memory address is performed using a cyclic redundancy check.

10. The computer-implemented method of claim 7, further comprising:

uploading, by the OS and to the data storage over the network, a latest updated local list of defective memory addresses on a periodic basis.

11. The computer-implemented method of claim 7, wherein replacing the latest updated list of defective memory addresses is performed based on a determination that the updated local list of defective memory addresses that is stored in the memory has been updated with a list of repaired memory addresses corresponding to portions of the plurality of defective portions of the memory that have been repaired by a basic input/output system ("BIOS").

12. The computer-implemented method of claim 11, wherein replacing the updated local list of defective memory addresses is performed based on a determination that the updated local list of defective memory addresses that is stored in the memory remains unchanged after receiving memory repair status information from the BIOS.

13. The computer-implemented method of claim 12, further comprising:

sending, by the OS and to the BIOS, a second local list of defective memory addresses, the second local list of defective memory addresses being retrieved from the memory and corresponding to a current updated local list of defective memory addresses;

receiving, by the OS and from the BIOS, a current list of repaired memory addresses;

comparing, by the OS, the current list of repaired memory addresses with the second local list of defective memory addresses retrieved from the memory;

based on a determination that the second local list of defective memory addresses lists repaired memory addresses contained in the current list of repaired memory addresses, generating, by the OS, a third local list of defective memory addresses by updating the second local list of defective memory addresses based on the comparison;

receiving, by the OS and from the data storage over the network, a first uploaded list of defective memory addresses that was uploaded to the data storage by the OS;

comparing, by the OS, the third local list of defective memory addresses with the first uploaded list of defective memory addresses; and based on a determination that the third local list of defective memory addresses is different from the first uploaded list of defective memory addresses, generating, by the OS, a second uploaded list of defective memory addresses by updating the first uploaded list of defective memory addresses based on the comparison, and uploading, by the OS and to the data storage over the network, the second uploaded list of defective memory addresses.

14. The computer-implemented method of claim 13, further comprising:

based on a determination that the second local list of defective memory addresses does not list repaired memory addresses contained in the current list of repaired memory addresses, comparing, by the OS, one of the current list of repaired memory addresses and the second local list of defective memory addresses with the first uploaded list of defective memory addresses that is received from the data storage; and based on a determination that the one of the current list of repaired memory addresses and the second local list of defective memory addresses is different from the first uploaded list of defective memory addresses, generating, by the OS, a fourth local list of defective memory addresses by replacing the second local list of defective memory addresses with the first uploaded list of defective memory addresses, and storing, by the OS, the fourth local list of defective memory addresses in the memory.

15. A system, comprising:

a processing system; and memory comprising computer executable instructions that, when executed, perform operations comprising:

sending, to a basic input/output system ("BIOS"), a first local list of defective memory addresses corresponding to a plurality of defective portions of the memory;

receiving, from the BIOS, a list of repaired memory addresses corresponding to portions of the plurality of defective portions of the memory that have been repaired by the BIOS;

comparing the list of repaired memory addresses with the first local list of defective memory addresses retrieved from the memory;

generating a second local list of defective memory addresses by updating the first local list of defective memory addresses based on the comparison;

receiving a first uploaded list of defective memory addresses that was previously uploaded to data storage by an operating system ("OS") of the system;

comparing the second local list of defective memory addresses with the first uploaded list of defective memory addresses; and based on a determination that the second local list of defective memory addresses is different from the first uploaded list of defective memory addresses:

generating a second uploaded list of defective memory addresses by updating the first uploaded list of defective memory addresses based on the comparison, and uploading, to the data storage, the second uploaded list of defective memory addresses.

16. The system of claim 15, wherein the sending the first local list of defective memory addresses to the BIOS is performed in response to a reboot of the system.

17. The system of claim 15, wherein the plurality of defective portions includes at least one of a portion of the memory that has memory errors, a portion of the memory that has single bit errors, or a portion of the memory that has multi-bit errors.

18. The system of claim 15, wherein the memory includes at least one of an active memory, a main memory, or a random access memory ("RAM").

19. The system of claim 15, wherein the operations further comprise:

uploading, to the data storage over the network, updated lists of defective memory addresses on a periodic basis.

20. The system of claim 15, wherein receiving the first uploaded list of defective memory addresses or a subsequent uploaded list of defective memory addresses is one of performed upon reboot of the system, performed upon request by the OS, or performed on a periodic basis.

* * * * *